Patented Aug. 7, 1928.

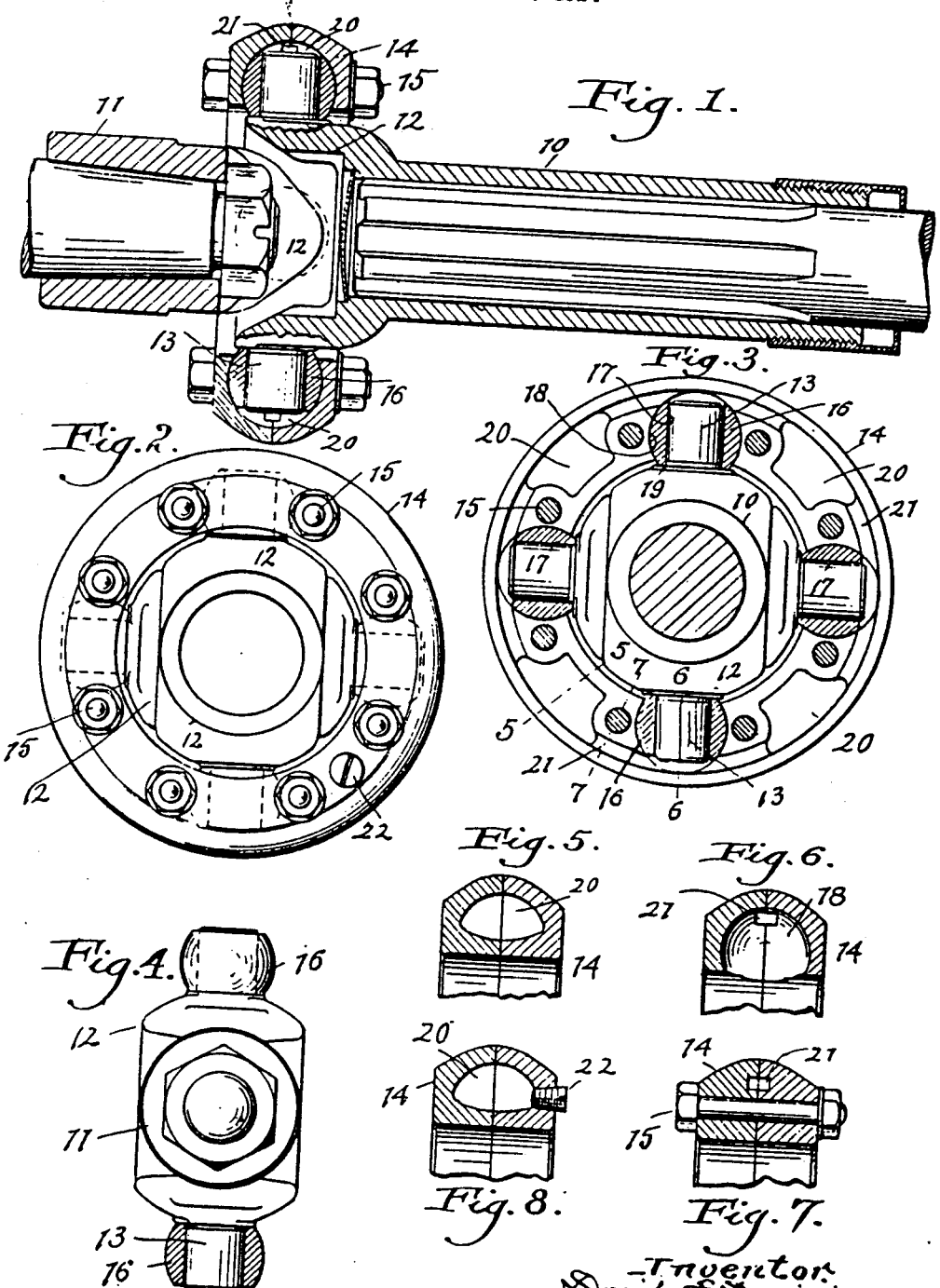

1,680,095

UNITED STATES PATENT OFFICE.

DAVID F. DOMIZI, OF CLEVELAND, OHIO.

UNIVERSAL JOINT.

Application filed February 6, 1924. Serial No. 690,900.

This invention relates to universal joints for driving one shaft from another, with the two shafts out of alignment, and such as are commonly employed in motor vehicle drives.

The chief objects of the invention are to provide an improved joint which is simple in construction, wherein wear is minimized and proper lubrication of the movable parts of the joint assured, and which automatically compensates for whatever misalignment there may be in the driving pins on each of the two main members of the joint due to imperfections of machining and to deflections under heavy loads.

The invention may be briefly summarized as consisting in certain novel details of construction, and combinations and arrangements of parts which will be described in the specification and pointed out in the appended claims.

In the accompanying sheets of drawings wherein I have shown the preferred embodiment of my invention, Fig. 1 is a longitudinal sectional view of a universal joint embodying my invention; Fig. 2 is an end view; Fig. 3 is a transverse sectional view, the section being taken at the meeting faces of the two parts of the casing; Fig. 4 is an end view of one of the forks of the joint with one of the spherical bushings in section; Figs. 5, 6 and 7 are transverse sectional views substantially along the lines 5—5, 6—6 and 7—7 of Fig. 3, showing both halves of the casing united and there being omitted from Fig. 6 the spherical bushing designed to be fitted into the socket shown, and also the pin adapted to be received in the bushing; and Fig. 8 is a view similar to Fig. 5, showing the normally closed opening for supplying lubricant to the casing.

Referring now to the drawings, my improved joint comprises driving and driven members, one of which is shown at 10 and the other at 11. These two members are provided at their adjacent ends with forks 12, each having a pair of diametrically opposite outwardly projecting pins 13, the pins of each fork being, as is customary, 180° apart and in a plane at right angles to the pins of the other fork.

These pins which are integral with the forks extend into an annular casing 14 consisting preferably of two counterpart halves secured together by bolts 15 which pass through the casing from one side to the other between the pins 11.

It is an important feature of the present invention that the torque is transmitted from the pins of the driving member to the casing and from the latter to the pins of the driven member through spherical bushings 16. These bushings have cylindrical openings 17 which receive the pins and in which the pins have a working fit, and the casing has spherical seats which receive the spherical bushings 16, and in which the latter are permitted to have a ball and socket rolling action, to permit self alignment during the original assembly of the parts and during use of the joint at times of sudden and excessive loads.

The pins 13, preferably extend entirely through the bushings 16 for the purpose of receiving lubricant, as will be explained, and preferably segments of the bushings are cut off on parallel planes at the inner and outer ends of the pins so as to provide at the outer ends of the pins spaces for the supplying of lubricant and so as to provide adjacent the inner ends of the pins flat faces on the bushings adapted to seat on faced portions 19 of the fork immediately surrounding the pins. It will be noted that the inner portions of the bushings 16 project slightly inwardly beyond the inner periphery of the casing 14.

As previously stated, the casing 14 is preferably formed of two counterpart halves. These are preferably coin-stamped, by which is meant, forged to substantially their shape and then pressed to final shape with dies which accurately form the hemispherical depressions or openings 17 which receive the bushings 16. Additionally by this same process there are formed in each half of the casing, oil reservoirs 20 which are located midway between the hemispherical depressions or sockets 18, and likewise there are formed in each half of the casing arc-shaped grooves 21 which extend between and connect together the outer portions of the reservoirs or pockets 20.

The inner faces of the two halves of the casing are preferably ground so that when they are clamped together by the bolts 15, there is a sufficiently tight fit to prevent leakage of lubricant. Of course, if desirable, packing may be employed between the engaging faces of the sections. The lubricant may be supplied so as to fill or substantially fill the oil reservoirs and passageways 20 through an opening leading to one of the reservoirs and normally closed by a plug 22, shown in Fig. 8.

When the joint involving my invention is in rotation, lubricant will be thrown outwardly by centrifugal force, and will stand at the same level in all the reservoirs and will fill the passageways 20. Likewise, centrifugal force acting on the oil in the reservoirs will cause the oil to assume in the working spaces between the pins 13 and the bushings, the same uniformity of level that it has in the reservoirs. In other words, it will be forced inwardly along the adjacent surfaces of the pins and bushings for a distance depending upon the amount of oil in the cavities 20 and 21 of the casing. By this method, and by capillary attraction which will cause the oil to reach the remainder of the adjacent surfaces of the pins and bushings, an ample supply of lubricant will be constantly provided for the working surfaces. This excellent lubricating feature, and the provision of the spherical bushings which provide self-alignment to compensate for whatever slight inaccuracies may exist in the alignment of the pins of the forks will minimize wear and make for smoothness, durability and efficiency in operation.

Having described my invention, I claim:—

1. A universal joint comprising driving and driven members, each provided with a pair of diametrically opposite power transmitting extensions, one pair in a plane at right angles to the other, an annular casing into which said extensions project, and spherical bushings receiving said extensions and having spherical seats in the casing.

2. A universal joint comprising a driving member, a driven member, each provided with two diametrically opposite cylindrical pins, spherical bushings receiving said pins, and an annular casing having spherical seats receiving the bushings.

3. A universal joint comprising driving and driven members, each provided with a pair of diametrically opposite power transmitting extensions, one pair in a plane at right angles to the other, an annular casing into which said extensions project, and spherical bushings receiving said extensions and having spherical seats in the casing, said casing being composed of counterpart members clamped together on the median line of the casing.

4. A universal joint comprising driving and driven members, each provided with a pair of diametrically opposite power transmitting extensions, one pair in a plane at right angles to the other, an annular casing into which said extensions project, and spherical bushings receiving said extensions said casing having spherical sockets receiving the bushings and having oil reservoirs between the sockets and passageways between the reservoirs and the sockets.

5. In a universal joint, the combination of a pair of trunnioned coupling members, an intermediate two-piece transmission member divided in a longitudinal median plane to be fastened together and thereby complete the connection between said coupling members, the pieces being provided with complementary spherically conformed depressions therein to provide sockets when said pieces are assembled together, and spherical-shaped bearing members arranged to fit in the sockets in said transmission member having cylindrical bearing openings therein to receive the trunnions of said coupling members, said bearing members being universally self-aligning as respects said transmission member when assembled on the trunnions of said coupling members.

6. A universal joint comprising driving and driven members each having a pair of diametrically opposite axially aligned trunnions, the trunnions of one member being in a plane at right angles to the trunnions of the other, spherical bushings receiving the trunnions, and means forming a driving connection between said members comprising a circumferentially divided member composed of a pair of rings adapted to receive the trunnion bushings between them and having means for drawing the rings together upon said bushings, said rings having upon their inner faces opposed spherically-shaped concavities formed to receive said bushings.

7. A universal joint comprising driving and driven members each having a fork provided with diametrically opposite outwardly projecting aligned cylindrical trunnions, the trunnions of one member being in a plane at right angles to the trunnions of the other, bushings for each trunnion each having a cylindrical bore to receive a trunnion and a spherical exterior, and means forming a driving connection between said members comprising a circumferentially divided member composed of a pair of rings adapted to receive the trunnion bushings between them and having means for drawing the rings together upon said bushings, said rings having upon their inner faces opposed spherical concavities formed to receive said bushings, and each adapted to engage a bushing inwardly of and outwardly of the center of curvature of the bushing.

In testimony whereof, I hereunto affix my signature.

DAVID F. DOMIZI.